No. 798,175. PATENTED AUG. 29, 1905.
C. ELLIS.
PROCESS FOR THE MANUFACTURE OF CEMENT CLINKER.
APPLICATION FILED MAR. 6, 1905.
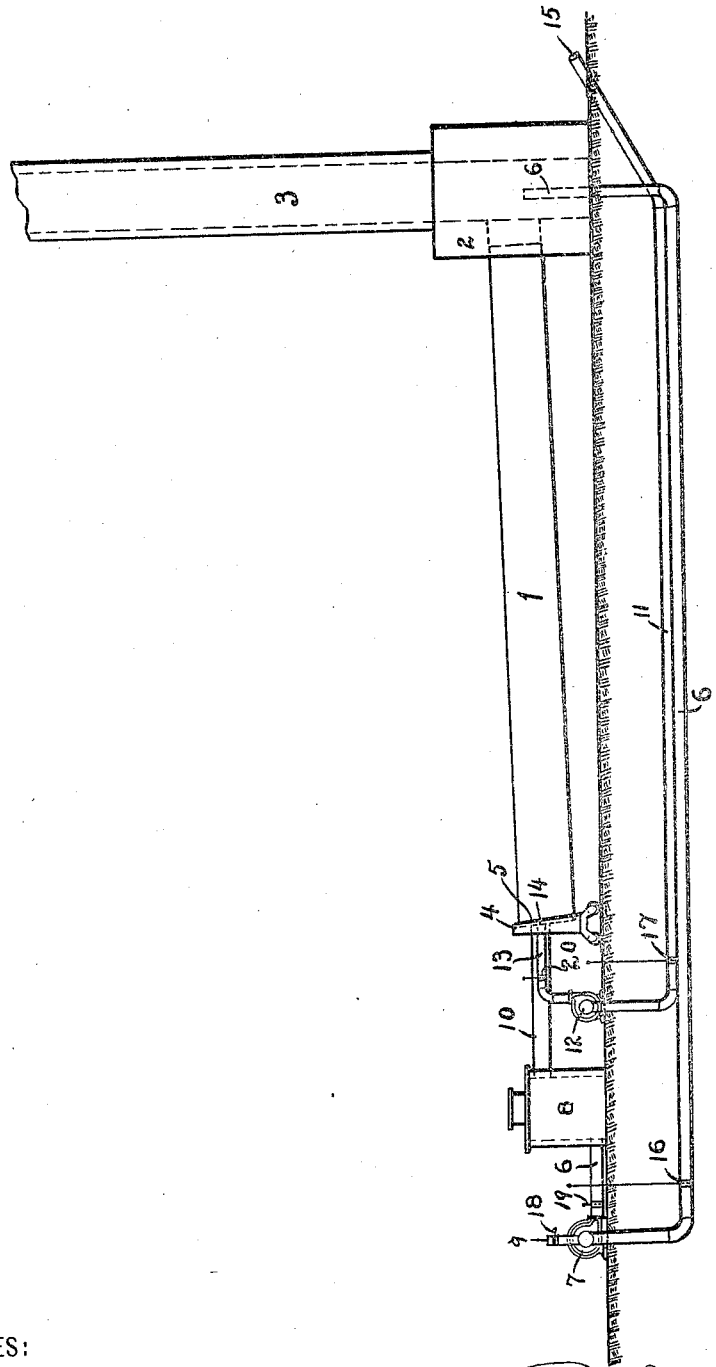
WITNESSES:
INVENTOR

UNITED STATES PATENT OFFICE.

CARLETON ELLIS, OF NEW YORK, N. Y., ASSIGNOR TO ELDRED PROCESS COMPANY, OF NEW YORK, N. Y., A CORPORATION OF NEW YORK.

PROCESS FOR THE MANUFACTURE OF CEMENT-CLINKER.

No. 798,175.     Specification of Letters Patent.     Patented Aug. 29, 1905.

Application filed March 6, 1905. Serial No. 248,467.

*To all whom it may concern:*

Be it known that I, CARLETON ELLIS, a citizen of the United States, and a resident of New York city, in the county of New York and State of New York, have invented certain new and useful Improvements in Processes for the Manufacture of Cement-Clinker, of which the following is a specification.

This invention relates to a cement-burning process of such a character that most of the heat now lost in the waste gases is conserved and utilized to great advantage in accelerating and intensifying combustion in the kiln.

As is well known, the rotary kiln for the burning of Portland cement is a highly inefficient apparatus from the standpoint of fuel consumption. Because of the rapid and intense combustion required for properly clinkering cement a great volume of heated gases passes to the stack and carries away, in the form of sensible heat, the major part of the heat energy of the coal. It has been found that from seventy to ninety per cent. of the total energy of the coal is lost in this manner.

It is the object of this invention to conserve a great portion of the heat of the escaping gases and to use this heat for the purpose of raising the air supplied to the lower part of the kiln to a temperature suitable for bringing about the desired intense combustion of such gaseous fuels as producer-gas or natural gas or even of powdered coal, which in many respects is similar to gaseous fuel in its behavior during combustion.

My process consists in taking from stack, housing, or upper part of the kiln, where the products of combustion escape to the stack, a portion of or, should it prove necessary, all of these products of combustion, in conveying these waste gases through a long passage extending to the lower or clinker-discharge end of the kiln, and there to introduce such portion as is needed into a gas-producing appliance adapted to reduce to carbon monoxid the carbon dioxid contained in the products of combustion.

My process consists, further, in the regeneration of the heat of the products of combustion, in the cooling of the products of combustion supplied to the producer, and in the preheating of the air supplied to the kiln for maintaining combustion.

For burning producer-gas successfully—that is to say, for creating the high temperatures required in those operations in which producer-gas is commonly used—it has been found that the air supplied for combustion must be highly heated. This is commonly accomplished by means of regenerative checkerwork—such, for instance, as is used in the Siemens regenerative furnace. In the burning of cement producer-gas has not heretofore been found feasible as a fuel, apparently for the reason that no efficient means for regeneration of the heat of the waste gases, and therefore for the economical application of heated air, could be found.

The process herein described makes it possible to use producer-gas successfully and economically in burning cement by virtue of the preheating effected through the abstraction of heat from the waste products of combustion in the continuous regenerative system illustrated in the accompanying drawing.

A gas-producing appliance which operates through the passage of a draft-current of air carrying carbon dioxid through a deep bed of ignited coal has been found not to work properly when the draft-current so applied is introduced at a high temperature. The control of the temperature of the producer under such conditions is a difficult matter, as marked fluctuations in the quality and temperature of the evolved gases are constant occurrences. Such fluctuations are disastrous to the burning of cement, owing to the fact that the material is fed down the length of the kiln in a continuous stream and constancy of flame obviously must be maintained in order that the product delivered at the lower end of the kiln be of uniform quality. The cooling of the products of combustion is therefore desirable, and the present process effects this end satisfactorily, and at the same time economically, because simultaneously it preheats the secondary air employed in the kiln.

In the accompanying drawing, 1 is a rotary cement kiln shown in elevation. At its upper end is situated the housing 2, on which is placed the stack 3. At the lower end of the kiln is the header 4, which covers the lower part of the kiln and has an opening 5, through which the fuel is admitted. A passage 6 in the housing 2 is shown extending beneath the kiln to the fan 7 and from thence on the exhaust side of the fan to a gas-producer 8. An air-inlet to the fan is shown at 9. A passage 10 connects the gas-producer 8 with the kiln 1. A second passage 11 runs alongside of passage 6 and connects with fan 12. On the exhaust side of this fan is situated the pipe 13, which enters the header of the kiln at 14. An air-inlet to passage 11 is shown at 15. The gates or valves 16 17 18 19 20 serve to regulate the flow of the various gases employed.

My method of operation is as follows: Hot gases are taken from the stack, drawn through the passage 6, mixed with air admitted through inlet 9, and propelled into the producer. The adjustment of the gates 16 and 18 regulates the relative amount of gas and air admitted to the producer. The gas generated by the passage of this mixture through the mass of fuel is delivered to the kiln through the pipe 10 and is there burned by a mixture with air drawn through the passage 11 and preheated by contact with the intervening partition of passage 6. It is of course possible to carry back the entire volume of products of combustion through the passage 6 or to dispose of them in various ways other than designated. In order that all the products of combustion be returned through this passage, a large fan-blower or other draft appliance would be necessary. It is possible even to place the stack in rear of the clinker-discharge end of the kiln rather than in the customary position on the upper housing and to return the products of combustion by natural draft, drawing from the stack-tunnel such amount of products of combustion as is needed for the regulation of the gas-producer. By conducting the whole volume of the stack-gases through a flue in this manner it is possible to better heat the secondary air.

Various means may be used for transmitting the heat of the waste gases to the secondary air other than that illustrated. For instance, the air may be sent through an iron tube placed inside of the passage through which the products of combustion pass. In this way the air will be heated from all sides, and the great conductivity of the metallic wall will especially facilitate the transmission of this heat.

What I claim is—

1. Process of burning cement, which consists in heating a progressively-advancing stream of cement material by the combustion of an oppositely-moving stream of fuel, in continuously abstracting heat by conduction from the waste products of combustion to heat the air required for combustion, in passing through a deep bed of ignited gas-producing fuel a portion of the so-cooled products of combustion in company with a predetermined proportion of air, in mixing the produced gas with the preheated air, and in subjecting the mixture to an igniting temperature in proximity to the cement material.

2. Process of burning cement, which consists in heating a progressively-advancing stream of cement material by the combustion of an oppositely-moving stream of fuel, in abstracting heat from the waste gases after substantial completion of combustion to continuously heat the air required for combustion of said fuel-stream, in passing through a deep bed of ignited gas-producing coal a portion of the so-cooled products of combustion in company with a predetermined proportion of air, and in mingling the gas with the preheated air in proximity to the cement material at an igniting temperature.

3. Process of burning cement, which consists in heating a progressively-advancing stream of cement material by the combustion of an oppositely-moving stream of fuel, in continuously abstracting heat by conduction from the waste products of combustion to heat the air required for combustion, in passing through a bed of ignited gas-producing fuel a portion of the so-cooled products of combustion in company with a predetermined proportion of air, in mixing the producer-gas with the preheated air, and in subjecting the mixture to an igniting temperature in proximity to the cement material.

4. Process of burning cement, which consists in heating a progressively-advancing stream of cement material by the combustion of an oppositely-moving stream of fuel, in abstracting heat from the waste gases after substantial completion of combustion to continuously heat the air required for combustion of said fuel-stream, in passing through a bed of ignited gas-producing coal a portion of the so-cooled products of combustion in company with a predetermined proportion of air, and in mingling the gas with the preheated air in proximity to the cement material at an igniting temperature.

Signed at New York city, in the county of New York and State of New York, this 3d day of March, A. D. 1905.

CARLETON ELLIS.

Witnesses:
JAS. K. CLARK,
MAX F. MANGELSDORFF.